Oct. 12, 1965 MASANAO OKATANI 3,211,834

FM MULTIPLEX STEREOPHONIC BROADCAST RECEIVER

Filed Dec. 4, 1963

Masanao Okatani
INVENTOR.

BY Wenderoth, Lind and Ponack,
Attorneys

3,211,834
FM MULTIPLEX STEREOPHONIC BROADCAST RECEIVER

Masanao Okatani, Kohoku-ku, Yokohama-shi, Japan, assignor to Pioneer Kabushiki Kaisha, Tokyo-to, Japan Filed Dec. 4, 1963, Ser. No. 328,003
Claims priority, application Japan, Dec. 8, 1962, 37/54,294
3 Claims. (Cl. 179—15)

Figures 1, 2, 3, 4:
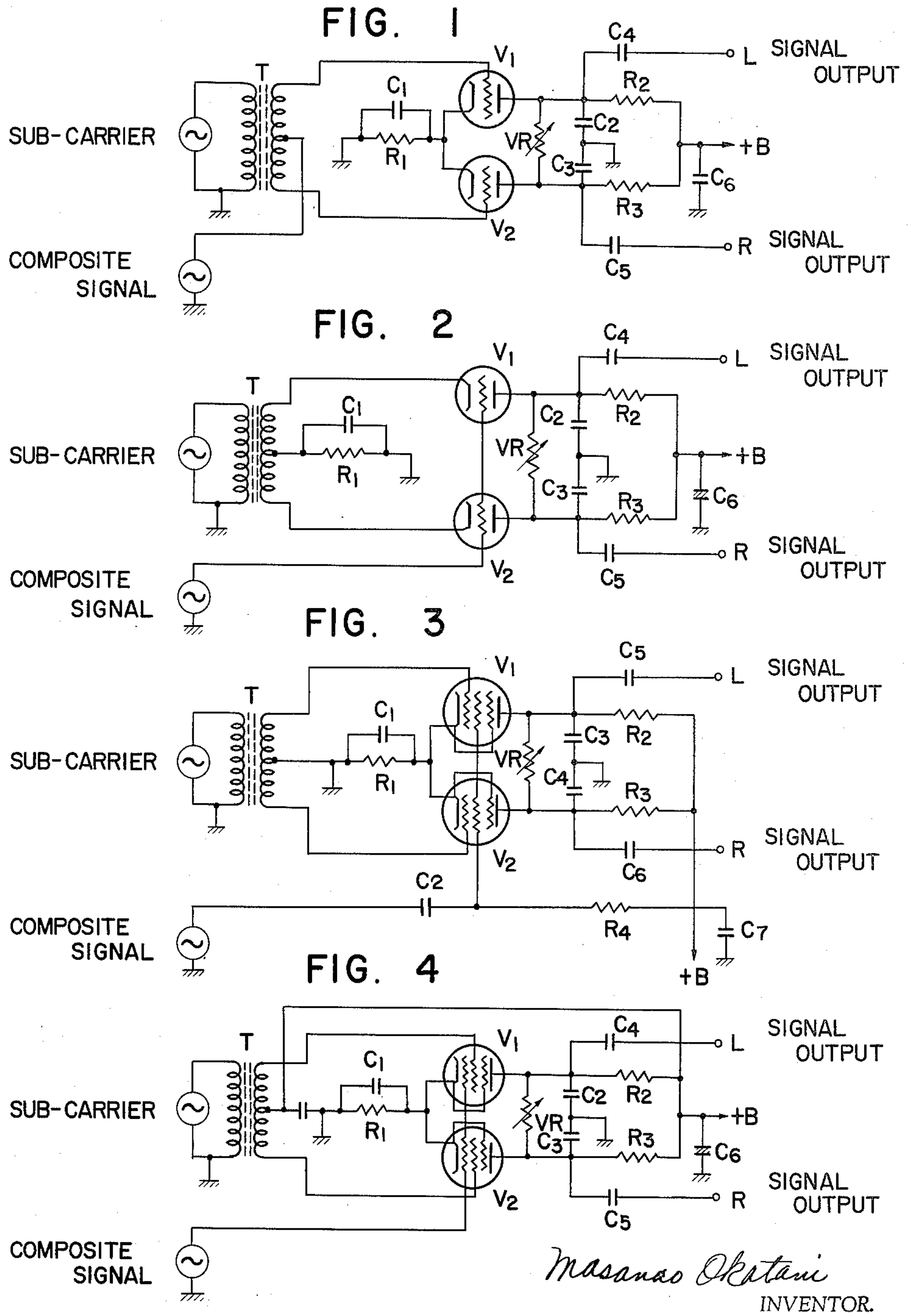

This invention relates to AM–FM multiplex stereophonic broadcasting and receiving systems, and more particularly it relates to a new method and means for accomplishing detection and matrixing of stereophonic sub-channel signals in an AM–FM multiplex stereophonic broadcast receiver.

In general, in the case of broadcasting the two audio-frequency signals of a right channel R and a left channel L in AM–FM multiplex broadcasting, according to the commonly known method, frequency modulation of main carrier wave has been carried out by a composite signal which consists of (1) A main channel signal consisting of the sum signal $(L+R)$ of left and rights channels which have audio-frequency bands of from 50 c./sec. to 15 kc./sec., (2) A sub-channel signal that has frequency bands of from 23 kc./sec. to 53 kc./sec. and obtained by carrying out carrier-suppression, double side band amplitude modulation of a sub-carrier wave of 38 kc./sec. by means of the difference signal $(L-R)$ of the left and right channels which have audio-frequency bands of from 50 c./sec. to 15 kc./sec., and (3) A pilot signal of 10 kc./sec. frequency which has been introduced for the case of demodulation of the sub-channel signal of the carrier-suppression, double side-band wave.

In the demodulation of this modulated signal in the receiver, the frequency modulation is detected to extract the composite signal, to which the sub-carrier is applied, and, with the use of two switches adapted to the "ON" during the first 50 percent of one period of the sub-carrier wave and to be "OFF" during the second 50 percent thereof, the sub-channel signal is detected and matrixing with the main channel signal is simultaneously carried out, whereby it is possible to extract the left and right audio-frequency signals L and R.

The present invention resides in a new method and means for accomplishing detection and matrixing of stereophonic sub-channel signals in an AM–FM multiplex stereophonic broadcast receiver as briefly described above.

Moreover, the method of the present invention is applicable not only to reception of radio waves of a multiplex stereophonic system as described above having a sub-channel signal which has been subjected to carrier-suppression, double side band amplitude modulation by use of a main channel signal consisting of the sum signal $(L+R)$ of the left and right channels and a difference signal $(L-R)$, but also to the case of reception of radio waves of multiplex stereophonic system having a sub-channel signal has been subjected to carrier-suppression, double side band amplitude modulation by use of a main channel signal having an audio-frequency band corresponding to the difference signal $(L-R)$ of the left and right channels and a sum signal $(L+R)$.

The nature, pricipies, and details of the present invention will be more clearly apparent by reference to the following description with respect to the former of the systems mentioned in the preceding paragraph, when taken in conjunction with the accompanying drawings in which like parts are designated by like reference characters, and in which:

FIGURE 1 is an electrical circuit diagram indicating the basic principle of the receiver according to the present invention;

FIGURES 2, 3, and 4 are circuit diagrams respectively showing other embodiments of the receiver according to the present invention.

Referring to FIGURE 1, the sub-carrier power source is connected to an oscillator of a frequency equal to that of the sub-carrier or to a sub-carrier power source obtained by amplifying a pilot signal. The composite signal power source is connected directly or through an amplifying circuit to the output terminal which does not pass through the de-emphasis circuit at the detector output terminals of the FM receiver.

The sub-carrier wave is then supplied to the primary side of a transformer T, and the composite signal is supplied to the center of secondary winding of the transformer T.

A cathode resistance $R_1$ for vacuum tubes $V_1$ and $V_2$ is so selected as to cause the bias to be ample and to cause the plate current to be cut off at the time of no signal.

A by-pass capacitor $C_1$ connected in parallel with the cathode resistance $R_1$ and by-pass capacitors $C_2$ and $C_3$ connected in parallel (for alternating current) to plate load resistances $R_2$ and $R_3$ of the vacuum tubes $V_1$ and $V_2$ are so selected as to accomplish by-passing with respect to only the sub-carrier wave. The resistance values of the plate load resistances $R_2$ and $R_3$ are selected to be equal.

By the connections of the transformer T as shown in FIGURE 1, a carrier wave is superposed to the sub-channel signal which is a carrier-suppression, double side band amplitude-modulated signal, whereby the composite signal consisting of the sub-channel which has been converted into ordinary amplitude-modulated signal and a main-channel signal is applied, with the same phase, to the control grids of the vacuum tubes $V_1$ and $V_2$. However, said grids are supplied with said composite signal with opposite phase with respect to the sub-carrier wave. In the case wherein the amplitude of the sub-carrier wave is sufficiently large relative to the amplitude of the composite signal, the vacuum tubes $V_1$ and $V_2$ are alternately switched by the sub-carrier wave.

That is, if, as a supposition, the sum of a plate current proportional to $(L+R)$ and a plate current proportional to the envelope $(L-R)$ of one side of the amplitude-modulated signal obtained by superposing a carrier wave to the sub-channel signal flows in the vacuum tube $V_1$, the sum of a plate current proportional to $(L+R)$ and a plate current proportional to $-(L-R)$ which is the envelope of the opposite side of the said amplitude-modulated signal will flow in the vacuum tube $V_2$. Then, from a consideration of the signal voltage produced at each of the terminals of the plate load resistances $R_2$ and $R_3$, it will be apparent that, since detection is accomplished with respect to the $(L-R)$ component by the by-passing due to the above-mentioned switching operation and the by-pass capacitors $C_2$ and $C_3$, the amplitude of L and R of the $(L-R)$ component becomes less relative to the amplitude of L and R of the $(L+R)$ component. Therefore, in order to make a distinction, the L and R of the $(L-R)$ component will hereinafter be designated by L′ and R′. Then, the signal voltages produced at the terminals of the resistances $R_2$ and $R_3$ assume the following matrixing.

At the two terminals of the resistance $R_2$:

$$(L+R)+(L'-R')=(L+L')+(R-R') \quad (1)$$

At the two terminals of the resistance $R_3$:

$$L+R+\{-(L'-R')\}=(R+R')+(L-L') \quad (2)$$

However, for the sake of convenience, it will be here assumed that the by-pass capacitor $C_1$ accomplishes by-passing with respect to the entire frequency band of the composite signal and that there is no negative feedback current, and the connection of the variable resistance VR shown in the FIGURE 1 will be neglected.

Since $L>L'$ and $R>R'$, an output consisting principally of the L signal and an extremely small amount of the R signal is produced at the two terminals of the plate load resistance $R_2$ of the vacuum tube $V_1$.

At the two terminals of the plate load resistance $R_3$ of the vacuum tube $V_2$, an output consisting principally of the R signal and an extremely small amount of the L signal is produced. Accordingly, in order to establish complete separation of the left and right channels, it is necessary to eliminate the second terms in Equations 1 and 2. For the sake of convenience, it will be assumed that the ratios of $L>L'$ and $R>R'$ are expressed by the following equations.

$$(L'=L(1-\alpha) \quad (3)$$

$$(R'=R(1-\alpha) \quad (4)$$

Then, by substituting values from the Equations 3 and 4 into the Equation 1, the following equation is obtained $$(L+L')+(R-R') =L+L(1-\alpha)+R-\{R(1-\alpha)\} =L(2-\alpha)+\alpha R \quad (5)$$

Similarly, Equation 2 may be written $$(R+R')+(L-L') =R+R(1-\alpha)+L-\{L(1-\alpha)\} =R(2-\alpha)+\alpha L \quad (6)$$

For the sake of simplicity, the operation of the vacuum tubes $V_1$ and $V_2$ will be considered only with respect to the audio-frequency component, and it will be further assumed that input signals respectively equivalent to the Equations 5 and 6 are applied respectively to the control grids of the vacuum tubes $V_1$ and $V_2$, that the amplification degrees of the vacuum tubes $V_1$ and $V_2$ with respect to audio-frequency signals have the relationship expressed by $$\text{Amplification degree of } V_1 =\text{Amplification degree of } V_2=\tau \quad (7)$$

and that the voltage division ratios of the total audio-frequency outputs of the tubes $V_1$ and $V_2$ and the output on the cathode side are expressed by $$\frac{R_1}{R_1+R_2}=\frac{R_1}{R_1+R_3}=\beta \quad (8)$$

Then, a signal voltage due to the sum of the cathode signal currents of the vacuum tubes $V_1$ and $V_2$ is produced at the two terminals of the cathode resistance $R_1$, and the component of this signal voltage is as follows:

$$\beta\tau\{L(2-\alpha)+\alpha R\}+\beta\tau\{R(2-\alpha)+\alpha L\} \quad (9)$$

Since signal according to the Equation 9 is applied, as negative feedback of input series-connection type, with opposite phase on the control grids of the vacuum tubes $V_1$ and $V_2$, the sum of the signal represented by the Equation 5 and the negative of the signal represented by the Equation 9 will appear at the control grid of the vacuum tube $V_1$, said sum being represented by the following equation.

$$L(2-\alpha)+\alpha R-[\beta\tau\{L(2-\alpha)+\alpha R\}+\beta\tau\{R(2-\alpha)+\alpha L\}]=L(2-\alpha-2\beta\tau)+R(\alpha-2\beta\tau) \quad (10)$$

At the control grid of the vacuum tube $V_2$, the signal becomes the sum of the signal represented by the Equation 6 and the negative of the signal represented by the Equation 9, said sum being represented by the following equation.

$$R(2-\alpha)+\alpha L-[\beta\tau\{R(2-\alpha)+\alpha L\}+\beta\tau\{L(2-\alpha)+\alpha R\}]=R(2-\alpha-2\beta\tau)+L(\alpha-2\beta\tau) \quad (11)$$

The second terms of the Equations 10 and 11 are cross-talk components, and by suitably selecting $\beta$ with respect to $\alpha$ and $\tau$, it is possible to cause the second term to be zero, positive, or negative. That is, in order to cause the second term to be zero and to eliminate the cross-talk components, the following relationships must be satisfied.

$$R(\alpha-2\beta\tau)=0 \quad (12)$$

$$L(\alpha-2\beta\tau)=0 \quad (13)$$

Accordingly, $$\alpha-2\beta\tau=0$$

and therefore, $$\beta=\frac{\alpha}{2\tau} \quad (14)$$

For the second term to be positive, $$\alpha-2\beta\tau>0$$

and therefore, $$\beta<\frac{\alpha}{2\tau} \quad (15)$$

For the second term to be negative, $$\alpha-2\beta\tau<0$$

and therefore, $$\beta>\frac{\alpha}{2\tau} \quad (16)$$

In the instant circuit, the cathode capacitor $C_1$ is in actual practice selected to accomplish by-passing with respect to only the sub-carrier wave. Furthermore, it is necessary to select a high resistance value for the cathode resistance $R_1$ so as to cause the plate current to be cut off at the time of no signal. Accordingly, the value of $\beta$ in the Equation 8 is large, and this condition is a necessary condition for obtaining the relationship expressed by the Equation 16.

That is, the second terms of the Equations 10 and 11 become negative and become equivalent input signals of the vacuum tubes $V_1$ and $V_2$. Then, the condition expressed by the Equation 16 can be applied to the term within the parentheses, ( ), in the Equations 12 and 13 to obtain the following equation.

$$\alpha-2\beta\tau=-\phi \quad (17)$$

When the Equations 10 and 11 are rewritten by use of the relationship of the Equation 17, the following equations are obtained.

$$L(2-\alpha-2\beta\tau)+R(\alpha-2\beta\tau) =L(2-2\alpha-\phi)-\phi R \quad (18)$$

$$R(2-\alpha-R\beta\tau)+L(\alpha-2\beta\tau) =R(2-2\alpha-\phi)-\phi L \quad (19)$$

For the state wherein equivalent input signals represented by the Equations 18 and 19 are introduced into the vacuum tubes $V_1$ and $V_2$, the output signals produced at the terminals of the plate load resistances R and $R_3$ are obtainable as the products of the signal represented by the Equations 18 and 19 and $\tau$.

Therefore, signals represented by the following equations appear at the two terminals of the resistance $R_2$, $$\tau\{L(2-2\alpha-\phi)-\phi R\}=\tau L(2-2\alpha-\phi)-\phi\tau \quad (20)$$

and at the two terminals of the resistance $R_3$, $$\tau\{R(2-2\alpha-\phi)-\phi L\}=\tau R(2-2\alpha-\phi)-\phi\tau L \quad (21)$$

Now, if a variable resistance VR is connected as shown, the output of the vacuum tube $V_2$ is divided by the variable resistance VR and the plate load resistance $R_2$ and is applied to the output side of the vacuum tube V, and the output of the vacuum tube $V_1$ is divided by the variable resistance VR and the plate load resistance $R_3$ and is applied to the output side of the vacuum tube $V_2$.

If the resistance value of the variable resistance VR is now set so as to produce the following relationship $$\frac{R_2}{VR+R_2}=\frac{R_3}{VR+R}=\frac{\phi}{2-2\alpha-\phi} \tag{22}$$

the component applied from the vacuum tube $V_2$ side to the vacuum tube $V_1$ side will become the product of the signals represented by the Equations 21 and 22.

That is, $$\{\tau R(2-2\alpha-\phi)-\phi\tau L\}\frac{\phi}{2-2\alpha-\phi}=\phi\tau R-\frac{\phi^2\tau L}{2-2\alpha-\phi} \tag{23}$$

The component applied from the vacuum tube $V_1$ side to the vacuum tube $V_2$ side will become the product of the signals represented by the Equations 20 and 22.

That is, $$\{\tau R(2-2\alpha-\phi)-\phi\tau R\}\frac{\phi}{2-2\alpha-\phi}=\phi\tau L-\frac{\phi^2\tau R}{2-2\alpha-\phi} \tag{24}$$

Consequently, in this case, the sum of the signals represented by the Equations 20 and 23 is produced at the terminals of the resistance $R_2$, as follows:

$$\tau L(2-2\alpha-\phi)-\phi\tau R+\phi\tau\mathrm{R}-\frac{\phi^2\tau L}{2-2\alpha-\phi}=\tau L(2-2\alpha-\phi)-\frac{\phi^2\tau L}{2-2\alpha-\phi}$$

$$=L\tau\left(2-2\alpha-\phi-\frac{\phi^2}{2-2\alpha-\phi}\right) \tag{25}$$

Similarly, the sum of the signals represented by the Equations 21 and 24 is produced at the terminals of the resistance $R_3$, as follows:

$$\tau R(2-2\alpha-\phi)-\phi\tau L+\phi\tau L-\frac{\phi^2\tau L}{2-2\alpha-\phi}=\tau R(2-2\alpha-\phi)-\frac{\phi^2\tau R}{2-2\alpha-\phi}$$

$$=\tau R\left(2-2\alpha-\phi-\frac{\phi^2}{2-2\alpha-\phi}\right) \tag{26}$$

In the state expressed by the Equations 25 and 26, the cross-talk components are eliminated, and, by setting the resistance value of the variable resistance VR to correspond to the relationship expressed by the Equation 22, the left and right channels are completely separated. By selecting the resistance value of the variable resistance VR to be a value other than that corresponding to the relationship of the Equation 22, it is possible to adjust, at will, the degree of this separation.

A receiver circuit arrangement in which the operational principle of the present invention is applied is shown in FIGURE 2. This circuit is advantageous in the case wherein the output impedance of the composite signal power source is high and cannot be neglected with respect to the subcarrier wave or in the case wherein the composite signal cannot be applied to the midpoint of the transformer T because of some reason such as the inductance on the secondary side of the transformer T being high, the distributed capacitance of the wiring from the transformer T to the control grids of the vacuum tubes $V_1$ and $V_2$ being high, and phase deviation in the high-frequency region of the composite signal occurring.

In this circuit, the sub-carrier wave which is a switching signal is applied with opposite phase to the two cathodes, and the composite signal is applied with the same phase to the two grids. The operation of superposing the sub-carrier wave to the carrier-suppression, double side band, amplitude-modulated signal is accomplished electronically within the vacuum tubes $V_1$ and $V_2$. The secondary winding of the transformer T is selected to have an inductance which is negligible with respect to audio frequencies, and the circuit constants of the biases of the vacuum tubes $V_1$ and $V_2$ and other CR elements are determined in the same manner as in the case of the circuit shown in FIGURE 1. For the switching operation of the vacuum tubes $V_1$ and $V_2$ matrixing, and adjustment of the degree of separation, the same operational principles as in the case illustrated in FIGURE 1 can be applied.

In other embodiments of the invention as shown in FIGURES 3 and 4, pentodes are used for the vacuum tubes $V_1$ and $V_2$, and the composite signal and the subcarrier are respectively applied separately to the first control grid and the second control grid thereof, mutual interference with respect to the power source circuits being thereby reduced, and, at the same time, the detection gain being further increased.

In the circuit shown in FIGURE 3, the sub-carrier is applied to the first control grid, and the composite signal is applied to the second control grid. The characteristic feature in this case is that, although the load with respect to the sub-carrier power source is small, the load with respect to the composite signal power source is relatively large.

In the circuit shown in FIGURE 4, the sub-carrier is applied to the second control grid, and the composite signal is applied to the first control grid. The characteristic feature in this case is that the load with respect to the sub-carrier power source is relatively large, and the load with respect to the composite signal power source is small.

In the case of switching by means of diode, the total gain of the receiver is extremely deficient because of the attenuation of the demodulation circuit, so that it is necessary to provide a separate audio-frequency amplifier in a subsequent stage and, in addition, it is necessary to provide an equalizing circuit containing a reactance element for the purpose of equalizing the L and R of each of the components $(L+R)$ and $(L-R)$ after switching. In this case, there is the disadvantage of a flat frequency versus degree of separation characteristic not being obtainable because of phase shifting due to the equalizing circuit and because of difficulty in causing the equalizing characteristic thereof to be flat over the entire required frequency band.

In the receiver according to present invention, however, not only are all of these difficulties overcome, but, by carrying out detecting of the composite signal by switching by means of triode tubes or multielectrode tubes as described above, the detection gain is increased. Furthermore, by grounding the two cathodes of the switching tubes through a common cathode resisance, and by utilizing the condition wherein the negative feedback ratio due to the cathode resistance is large because of the high cathode resistance caused by sufficient bias of the switching tube, the cross-talk components of the two channels are converted into opposite phases, and the resulting signals are suitably voltage-divided on the plate side and mixed, whereby, it is made possible to adjust the degree of separation through the use of a simple circuit which does not contain a reactance element.

It should be understood, of course, that the foregoing disclosure relates to only preferred embodiments of the invention and that it is intended to cover all changes and modifications of the examples of the invention herein chosen for the purposes of the disclosure, which do not constitute departures from the spirit and scope of the invention as set forth in the appended claims.

What is claimed is:

1. In an FM multiplex stereophonic broadcast receiver, the combination comprising: two multielectrode vacuum tubes other than diodes which are amply biased, and the plate currents of which are cut off, the said two vacuum tubes being electrically disposed in parallel arrangement with the same polarity; a first means adapted to apply to the control grids of the said two vacuum tubes signals which consist of composite signals of the same phase and switching signals of oppoite phase, thereby to accomplish, simultaneouly, switching and matrixing of the composite signal and to accomplish detecting, the resulting two, left and right, detected outputs being audio-frequency amplified by means of the said two vacuum tubes to increase the detection gain; a common impedance through which the cathodes of the said two vacuum tubes are grounded, thereby to obtain mutually acting negative feedbacks; and means to create cross-talk components of opposite phase in accordance with the said negative feedbacks and to cause mutual-mixing of the said cross-talk components on the output side, thereby affording adjustment of the degree of separation.

2. The combination according to claim 1 wherein the said first means is adapted to apply the said composite signals of the same phase and the switching signals of opposite phase separately to the control grids and cathodes of the said two vacuum tubes.

3. The combination according to claim 1 wherein the said first means is adapted to apply separately the said composite signals of the same phase and the switching signals of opposite phase respectively to the first and second control grids of the said vacuum tubes.

References Cited by the Examiner

UNITED STATES PATENTS 3,175,040 3/65 Recklinghausen -------- 179—15

DAVID G. REDINBAUGH, *Primary Examiner.*